US009254984B2

(12) United States Patent
Christopher et al.

(10) Patent No.: US 9,254,984 B2
(45) Date of Patent: Feb. 9, 2016

(54) WELDING WIRE FEEDER WITH IMPROVED WIRE GUIDE

(75) Inventors: Mark Richard Christopher, Neenah, WI (US); Nicholas Alexander Matiash, Oshkosh, WI (US)

(73) Assignee: Illinois Tool Works Inc., Glenview, IL (US)

( * ) Notice: Subject to any disclaimer, the term of this patent is extended or adjusted under 35 U.S.C. 154(b) by 563 days.

(21) Appl. No.: 13/434,496

(22) Filed: Mar. 29, 2012

(65) Prior Publication Data

US 2013/0048621 A1  Feb. 28, 2013

Related U.S. Application Data

(63) Continuation-in-part of application No. 13/215,033, filed on Aug. 22, 2011.

(60) Provisional application No. 61/423,837, filed on Dec. 16, 2010, provisional application No. 61/423,843, filed on Dec. 16, 2010.

(51) Int. Cl.
| | |
|---|---|
| *B23K 9/00* | (2006.01) |
| *B23K 9/12* | (2006.01) |
| *B65H 57/18* | (2006.01) |
| *B23K 9/133* | (2006.01) |

(52) U.S. Cl.
CPC ............... *B65H 57/18* (2013.01); *B23K 9/125* (2013.01); *B23K 9/1336* (2013.01); *B65H 2701/36* (2013.01)

(58) Field of Classification Search
CPC .................. B23K 9/133–9/1336; B23K 9/125; B65H 2701/36

USPC ........... 219/136, 137 R, 137.2, 137.21, 137.7
See application file for complete search history.

(56) References Cited

U.S. PATENT DOCUMENTS

| | | | |
|---|---|---|---|
| 1,927,896 A * | 9/1933 | Meller | 314/72 |
| 2,093,394 A * | 9/1937 | Emery | 219/137 R |
| 3,279,669 A * | 10/1966 | Bernard et al. | 226/181 |
| 3,282,304 A * | 11/1966 | Coleman | 242/566 |
| 3,389,545 A * | 6/1968 | Grunder et al. | 57/12 |

(Continued)

FOREIGN PATENT DOCUMENTS

| | | |
|---|---|---|
| CH | 498034 A | 10/1970 |
| CN | 1464808 | 12/2003 |

(Continued)

OTHER PUBLICATIONS

International Search Report from PCT application No. PCT/US2013/034226 dated Jul. 5, 2013, 14 pgs.

*Primary Examiner* — Sang Y Paik
(74) *Attorney, Agent, or Firm* — Fletcher Yoder P.C.

(57) ABSTRACT

A wire guide for use in a welding wire feeder is provided. The wire guide includes two guide surfaces spaced from one another to define an opening through which welding wire is directed from a spool to a wire drive assembly of the wire feeder. The wire guide may also include a side flange extending from an outboard position of the wire guide to maintain the wire within a desired region of the wire drive assembly, such as a space formed by grooves along rollers of the wire drive assembly. The side flange may be formed integrally with an outboard guide surface of the wire guide. The guide surfaces and the side flange may be formed integrally into a one-piece wire guide structure.

17 Claims, 7 Drawing Sheets

(56) References Cited

U.S. PATENT DOCUMENTS

| | | | |
|---|---|---|---|
| 3,901,425 A | 8/1975 | Taylor | |
| 4,019,669 A | 4/1977 | Tanimoto | |
| 4,733,038 A * | 3/1988 | Girardin | 219/69.12 |
| 5,016,803 A | 5/1991 | Ohashi | |
| 5,692,700 A * | 12/1997 | Bobeczko | 242/588.2 |
| 5,816,466 A | 10/1998 | Seufer | |
| 6,066,833 A | 5/2000 | Rigdon | |
| 6,227,025 B1 * | 5/2001 | Kutsuwada et al. | 72/250 |
| 6,388,234 B1 | 5/2002 | Collins et al. | |
| 7,383,973 B2 * | 6/2008 | Enyedy | 226/181 |
| 2005/0224485 A1 | 10/2005 | Matiash et al. | |
| 2008/0041910 A1 | 2/2008 | Enyedy | |
| 2012/0152925 A1 | 6/2012 | Christopher et al. | |

FOREIGN PATENT DOCUMENTS

| | | |
|---|---|---|
| CN | 102186618 | 9/2011 |
| JP | S59229288 | 12/1984 |
| JP | S6051914 A | 3/1985 |
| JP | S60206571 A | 10/1985 |
| JP | H05115974 | 5/1993 |

* cited by examiner

WELDING WIRE FEEDER WITH IMPROVED WIRE GUIDE

CROSS REFERENCE TO RELATED APPLICATIONS

This application is a continuation-in-part of U.S. patent application Ser. No. 13/215,033, entitled "Welding Wire Feeder with Improved Wire Guide," filed Aug. 22, 2011, which claims priority to U.S. Provisional Patent Application No. 61/423,837, entitled "Obround/Elliptical Guide", filed Dec. 16, 2010 and to U.S. Provisional Patent Application No. 61/423,843, entitled "Inlet Guide Pins," filed Dec. 16, 2010, all of which are herein incorporated by reference.

BACKGROUND

The invention relates generally to welding systems, and, more particularly, to a welding wire guide for use in a welding system.

Welding is a process that has increasingly become ubiquitous in various industries and applications. While such processes may be automated in certain contexts, a large number of applications continue to exist for manual welding operations. Such welding operations rely on a variety of types of equipment to ensure the supply of welding consumables (e.g., wire feed, shielding gas, etc.) is provided to the weld in an appropriate amount at the desired time. For example, metal inert gas (MIG) welding typically relies on a wire feeder to ensure a proper wire feed reaches a welding torch.

Such wire feeders facilitate the feeding of welding wire from a wire spool, through a pair of wire feed rolls, to the welding torch at the desired wire feed rate. Typically the wire is guided into the feed rolls with a tapered cylindrical tube fixed adjacent to the feed rolls. As the stack diameter of the wire wound on the spool changes due to wire use, the angle in the vertical plane at which the wire enters the cylindrical guide changes. In addition, the angle at which the wire enters the guide changes in the horizontal plane due to the helical unwind of the wire spool. Unfortunately, such an arrangement forces the wire into a fixed entry angle by sharply redirecting the wire as it enters the cylindrical guide. This leads to deformation of the wire surface and causes shavings from the wire to detach, which can ultimately clog welding torch liners and tips. Accordingly, there exists a need for a wire guide that overcomes these drawbacks.

BRIEF DESCRIPTION

In an exemplary embodiment, a welding wire feed device includes a spool support configured to receive and support a spool of welding wire and a wire drive assembly configured to draw wire from the spool and to drive the wire towards a welding application. The welding wire feed device also includes a wire guide having two elongated guide surfaces spaced from one another to define an opening through which the wire is guided from the spool to the wire drive assembly.

In another embodiment, a welding wire feed device includes a wire guide having two elongated guide surfaces spaced from one another to define an opening through which welding wire is guided from a spool to a wire drive assembly. The wire guide also has a side flange extending from an outboard portion of the wire guide to maintain the welding wire tracking to a desired region of a roller of the wire drive assembly.

In a further embodiment, a welding wire feed device includes a wire guide having inboard and outboard guide surfaces spaced from one another to define an opening through which welding wire is guided from a spool to a wire drive assembly. The inboard guide surface is spaced upstream relative to the outboard guide surface. The wire guide also include a side flange adjacent the outboard guide surface for maintaining the welding wire tracking to a desired region of the wire drive assembly.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of an improved wire guide for use in a welding wire feeder are provided. The wire guide is adapted to direct welding wire from a spool to rollers of a wire drive assembly, and to enable relatively easy threading of the wire into a region between the rollers. The wire guide includes two guide surfaces that define an opening through which the wire is directed from the spool to the wire drive assembly. The guide surfaces may be mounted to a guide holder portion of the wire guide for securing the wire guide to the wire drive assembly. The wire guide may also include a side flange extending from an outboard side of the wire guide. The side flange is designed to keep the welding wire tracking toward a desired region of the wire drive assembly, such as a groove formed along the rollers. The side flange may be formed integrally with an outboard guide surface of the wire guide. In some embodiments, the wire guide may be a one-piece structure including the guide surfaces and the side flange.

Figure 1:
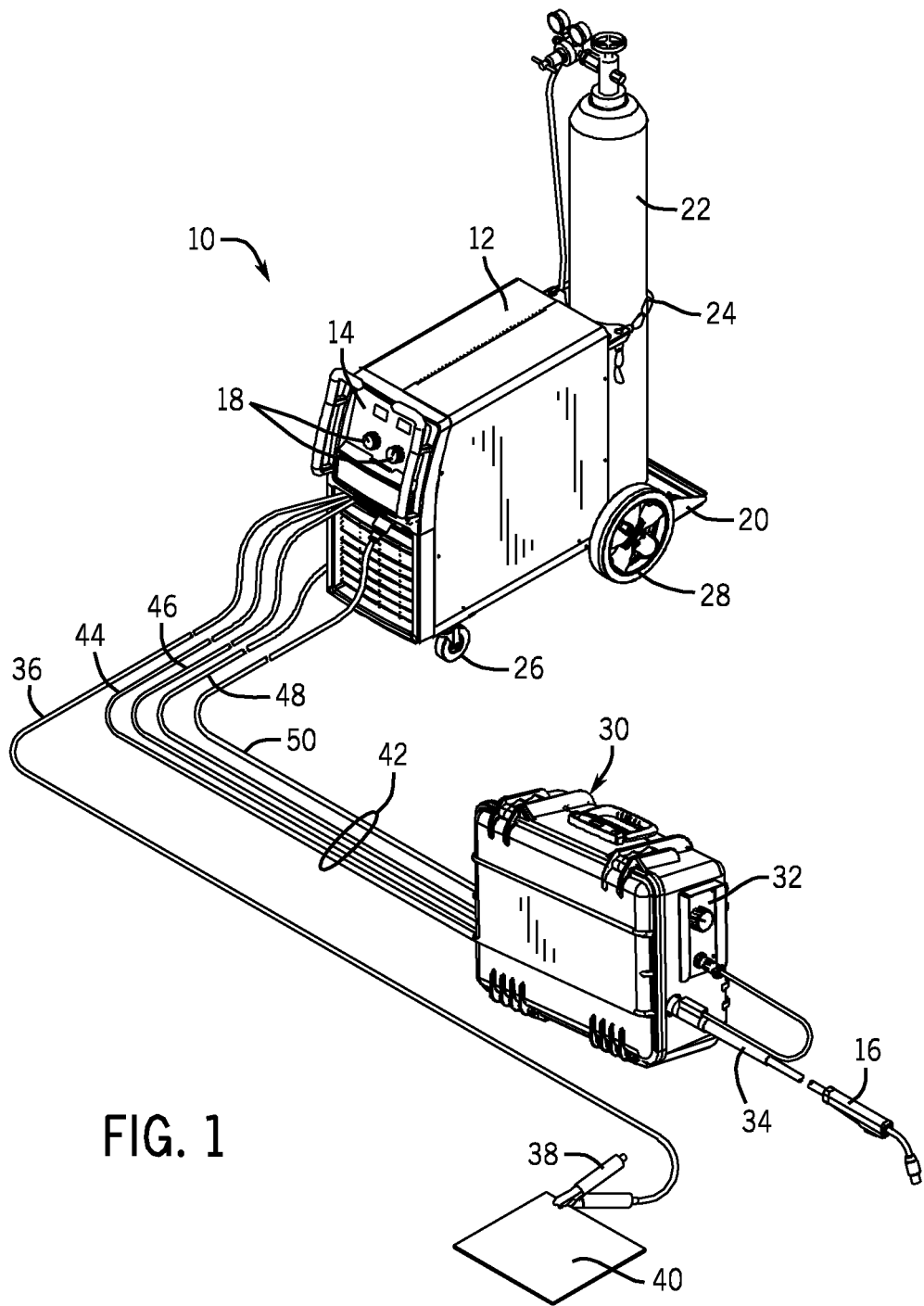
FIG. 1 is a perspective view of an exemplary welding power supply coupled to a wire feeder in accordance with aspects of the present invention.

Turning now to the drawings, FIG. 1 illustrates an exemplary welding system 10 which powers, controls, and provides supplies to a welding operation. The welding system 10 includes a welder 12 having a control panel 14 through which a welding operator may control the supply of welding materials, such as gas flow, wire feed, and so forth, to a welding gun 16. To that end, the control panel 14 includes input or interface devices, such as control inputs 18 that the operator may use to adjust welding parameters (e.g., voltage, current, etc.). The welder 12 may also include a tray 20 mounted on a back of the welder 12 and configured to support a gas cylinder 22 held in place with a chain 24. The gas cylinder 22 is the source of the gas that supplies the welding gun 16. Furthermore, the welder 12 may be portable via a set of smaller front wheels 26 and a set of larger back wheels 28, which enable the operator to move the welder 12 to the location of the weld. It should be noted, however, that the present wire guide techniques may be used with any suitable type of welding system, typically MIG systems utilizing solid, flux cored or metal core wires fed by a wire feeder as described below. Moreover, the techniques may be used with both manual and automated welding systems.

The welding system 10 also includes a wire feeder 30 that provides welding wire to the welding gun 16 for use in the welding operation. The wire feeder 30 may include a control panel 32 that allows the user to set one or more wire feed parameters, such as wire feed speed. In presently contemplated embodiments, the wire feeder 30 houses a variety of internal components, such as a wire spool, a wire feed drive system, a wire guide, and so forth.

A variety of cables couple the components of the welding system 10 together and facilitate the supply of welding materials to the welding gun 16. A first cable 34 couples the welding gun 16 to the wire feeder 30. A second cable 36 couples the welder 12 to a work clamp 38 that connects to a workpiece 40 to complete the circuit between the welder 12 and the welding gun 16 during a welding operation. A bundle 42 of cables couples the welder 12 to the wire feeder 30 and provides weld materials for use in the welding operation. The bundle 42 includes a feeder power lead 44, a weld cable 46, a gas hose 48, and a control cable 50. Depending on the polarity of the welding process, the feeder power lead 44 connects to the same weld terminal as the cable 36. It should be noted that the bundle 42 of cables may not be bundled together in some embodiments. Conversely, in some systems some reduction in wiring may be realized, such as by communicating control and feedback signals over the welding power cable.

It should be noted that although the illustrated embodiments are described in the context of a constant voltage MIG welding process, the features of the invention may be utilized with a variety of other suitable welding systems and processes that utilize continuously fed wires.

Figure 2:
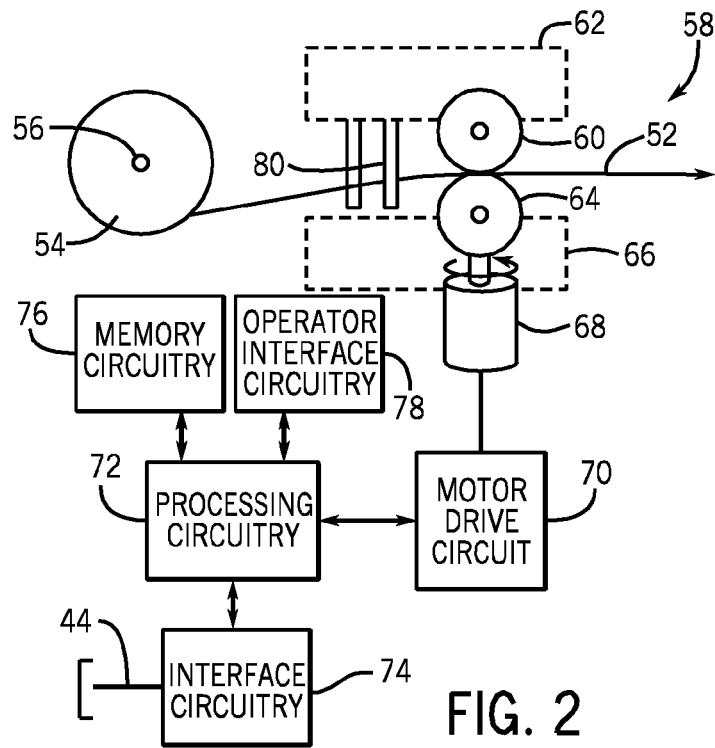
FIG. 2 is a block diagram illustrating exemplary functional components of the wire feeder of FIG. 1.

FIG. 2 is a block diagram illustrating internal components of the wire feeder 30. Welding wire 52 is supplied from a wire spool 54 that is mounted on a spool mount 56. The wire 52 is fed toward a welding operation by a wire drive assembly 58. The wire drive assembly includes an idle roller 60 mounted on an upper mounting surface 62, a drive roller 64 mounted on a lower mounting surface 66, and a motor drive 68 that turns the drive roller 64 in order to supply the wire at the desired wire feed rate to the welding operation.

A number of circuitry systems inside the wire feeder 30 facilitate the movement of wire 52 toward a welding operation at the desired wire feed rate. The motor drive circuit 70 causes the drive roller 64 to turn at the desired rate. Processing circuitry 72 communicates this turn rate to the motor drive circuit 70. Interface circuitry 74 connects directly to the feeder power lead 44 and supplies power to the processing circuitry 72. Memory circuitry 76 is connected to the processing circuitry 72, and operator interface circuitry 78 supplies the desired feed rate, which is input by the welding operator via the control panel, to the processing circuitry 72.

The wire feeder 30 features an elongated slit 80, which in the embodiment illustrated here is formed by two pins threaded into the upper mounting surface 62. The pins on either side of the elongated slit 80 guide the wire 52 from the spool 54 to the wire drive assembly 58 by defining a path the wire takes to become generally tangent to both the idle roller 60 and the drive roller 64.

Figure 3:
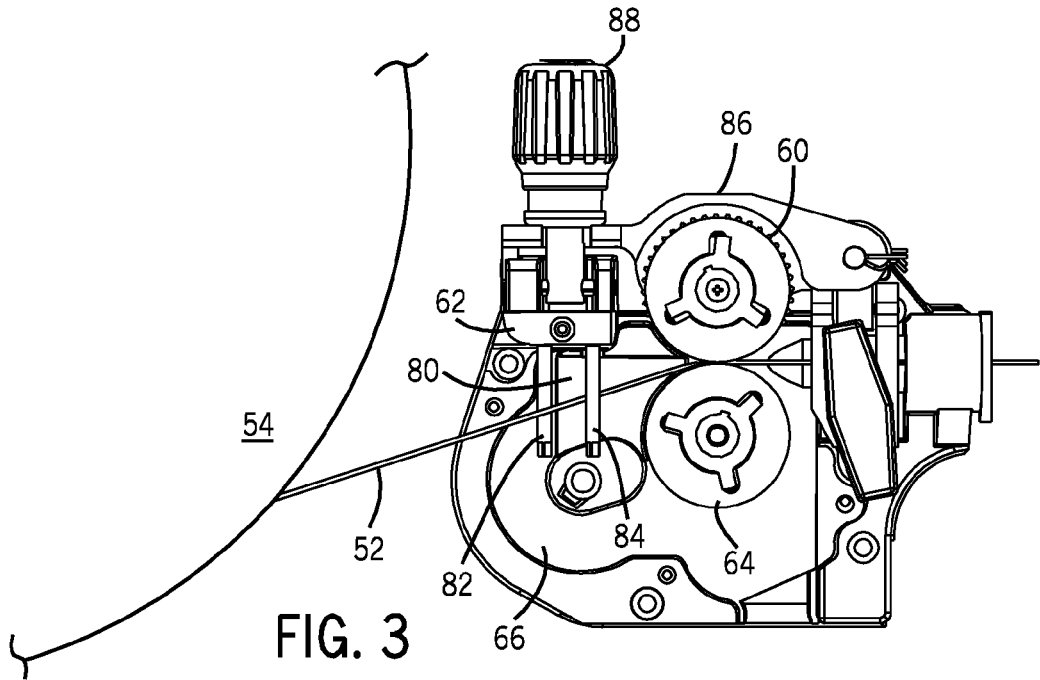
FIG. 3 is a side view of exemplary mechanical components of the wire feeder of FIG. 1.

FIG. 3 is a side view of certain of the functional components inside the wire feeder 30. The wire 52 is fed to a groove between the drive roller 64 and the idle roller 60, guided by the elongated slit 80 formed by two pins 82 and 84. The wire may touch one or both of the two pins or be suspended between the two pins, depending on the angle at which the wire comes off the spool 54 at a given moment. A pressure mechanism 86 urges the idle roller 60 towards the drive roller 64. This allows for more or less compression to be applied to the wire based on the size or material properties of the wire (e.g., steel versus aluminum welding wire). The pressure mechanism may be adjusted by a pressure adjustment knob 88.

Figure 4:
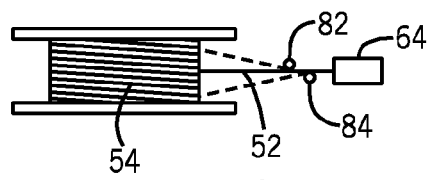
FIG. 4 is a top view illustrating an exemplary pin wire guide in accordance with aspects of the present invention.

FIG. 4 is a top view of certain of these components in the wire feeder 30. As the wire 52 unwinds from the spool 54, the point of tangency of the wire to the spool (e.g., where the wire separates from the stack stored on the spool) moves axially back and forth across the width of the spool. Dotted lines outline an area that the wire may occupy as the spool unwinds. The wire is aligned with the drive roller 64 in order to properly move through the wire feeder, and the pins 82 and 84 guide the wire into alignment with the drive roller.

It should be noted that the pins 82 and 84 are displaced some distance away from the drive roller 64 in the direction of the spool 54, and that, in a presently contemplated embodiment, pin 82 is displaced further in this direction than pin 84. In this way, the wire travels a greater distance through this elongated guide than if the two pins were placed exactly side by side. Various arrangements of such elements may, however, be envisaged. There is also a displacement between both pins and the wire when the wire is perfectly aligned from the spool to the drive roller. This displacement allows wire to be guided gradually from the angle at which it exits the spool to proper alignment with the drive roller. Guiding the wire in this way avoids damaging the wire outer surface. Additionally, bearings (not shown) may be placed over the outside of the pins 82 and 84. These bearings may be ceramic tubes or rollers configured to fit over the pins 82 and 84 and rotate about the stationary pins, further reducing friction between the wire and pins. Similarly, the pins may be allowed to rotate themselves, as in the form of rollers.

Figure 5:
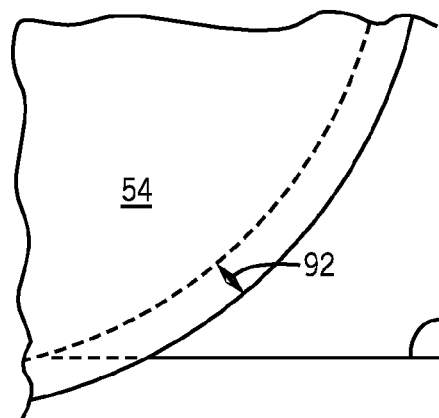
FIG. 5 illustrates an exemplary pin wire guide directing wire from a nearly full spool in accordance with aspects of the present invention.
Figure 5:
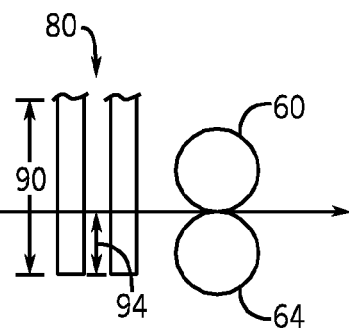

FIG. 5 illustrates wire 52, from a nearly full spool 54, being fed through the elongated slit 80 to the feed rolls 60 and 64. The elongated slit is defined by two pins which each have a total length 90. There is a short radial distance 92 between the outer edge of the wire wrapped around the spool, which is indicated by a dashed line, and the outer edge of the spool. The wire slopes upward from its point of tangency with the spool to its point of tangency with the feed rolls. The wire passes through the slit 80 at a short distance 94 from the bottom of the slit to the wire.

Figure 6:
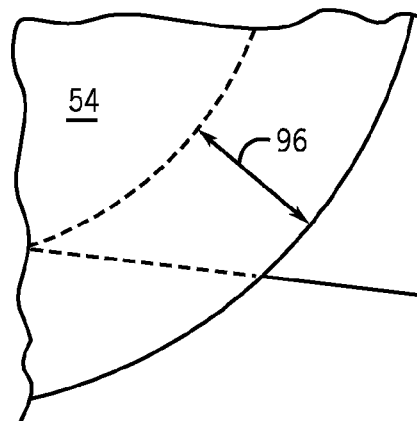
FIG. 6 illustrates an exemplary pin wire guide directing wire from a less full spool in accordance with aspects of the present invention.
Figure 6:
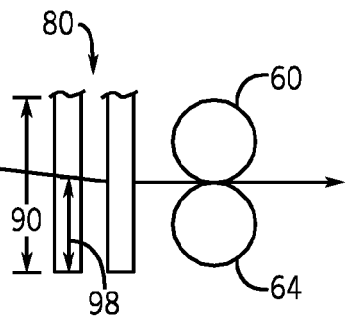

FIG. 6 illustrates wire 52, from a less full spool 54, being fed through the elongated slit 80 and to the feed rolls 60 and 64. There is a long radial distance 96 between the outer edge of the wire wrapped around the spool and the outer edge of the spool. Unlike FIG. 5, FIG. 6 shows the wire sloping downward from its point of tangency with the spool to its point of tangency with the feed rolls. The wire passes through the slit 80 at a long distance 98 from the bottom of the slit to the wire.

As shown in FIG. 5 and FIG. 6, the elongated slit 80 helps guide wire 52 that exits the spool 54 at a range of angles in the vertical plane as the wire slopes towards the feed rolls 60 and 64. The pin embodiment of slit 80 accommodates this range of angles, leading to less wear and tear on the wire as it approaches the feed rolls.

Figure 7:
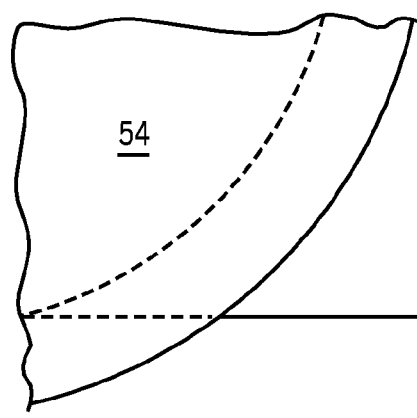
FIG. 7 illustrates an exemplary oblong wire guide directing wire from a spool in accordance with aspects of the present invention.
Figure 7:
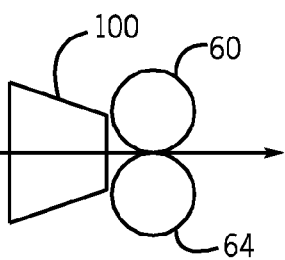

FIG. 7 illustrates wire 52 being fed from the spool 54 and guided through an elongated, generally conical guide 100 to the feed rolls 60 and 64. The conical guide 100 functions in generally the same manner as the pins described above, and feeds the wire over a wide range of angles at which the wire exits the spool without damaging the wire.

Figure 8:
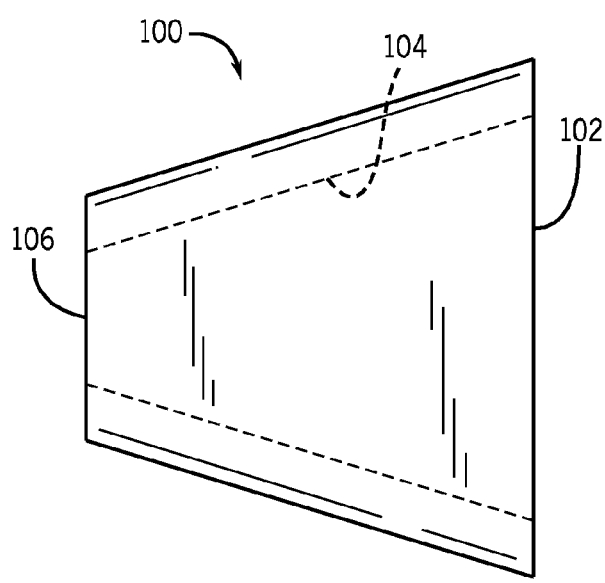
FIG. 8 is a side view of the exemplary oblong wire guide of FIG. 7.

FIG. 8 is a detailed side view of an exemplary conical guide 100, showing an entrance end 102, an inner wall 104, and an exit end 106. The entrance end 102 has a greater height than the exit end 106, to guide wire from a full range of angles from spool to feed rolls, as illustrated in FIG. 7.

Figure 9:
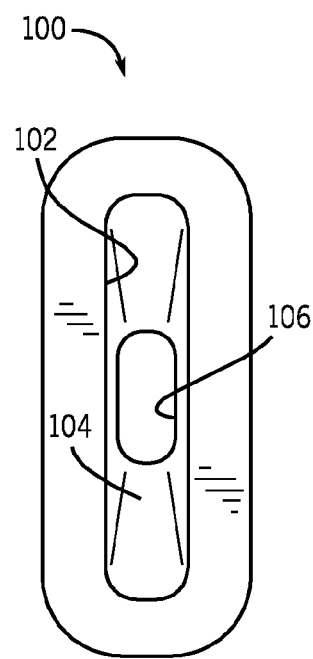
FIG. 9 is an entrance view of the exemplary oblong wire guide of FIG. 7.

FIG. 9 is a detailed entrance view of the conical guide 100, showing the entrance end 102, exit end 106, and inner wall 104 leading between the two ends. The inner wall 104 narrows both vertically and horizontally from the entrance end to the exit end, to accommodate wire coming from the spool at a range of angles in the vertical and horizontal planes.

The height of the conical guide 100 may be greater than the width of the guide, from the entrance end 102 to the exit end 106. A greater height allows for the range of angles from which wire exits the spool 54 in the vertical plane. Although wire exits the spool at a range of angles in the horizontal plane, as shown in FIG. 4, this range is smaller than the vertical range of angles from which the wire exits the spool.

The conical guide 100 creates an oblong slit with rounded corners through which the welding wire 52 passes. The generally oblong shape accounts for the difference in range of angles in the vertical and horizontal plane from which the wire will be guided. The rounded, elliptical edges eliminate sharp corners so that the wire will not become pinned in an inside corner of the guide or rub against a sharp corner upon entering or exiting the guide, thereby avoiding damage to the wire. The conical guide 100 may also feature rounded outside edges at its entrance end 102 and exit end 106 to facilitate smoother entry and exit of the wire. Where desired, the guide may be allowed to pivot so as to better align with the entering wire.

Figure 10:
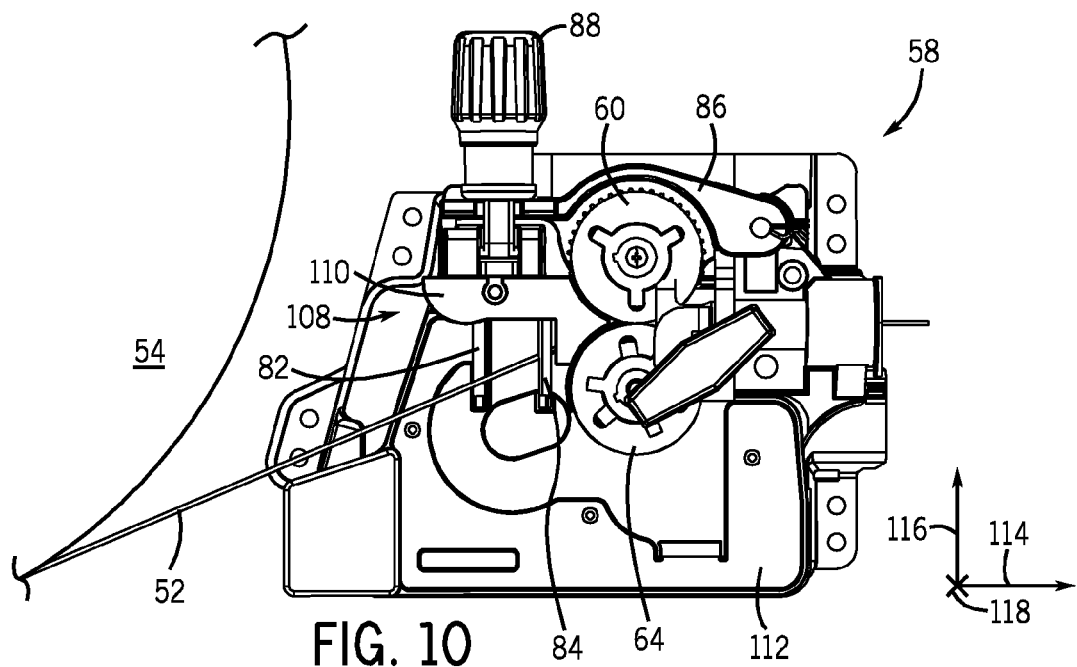
FIG. 10 is a side view of certain components of the wire feeder of FIG. 1, including an exemplary wire guide.

FIG. 10 is a side view of exemplary components of the wire feeder 30 of FIG. 1, including a wire guide 108. The wire guide 108 includes two elongated guide surfaces spaced from one another to define an opening through which the welding wire 52 may be guided from the spool 54 to the wire drive assembly 58. In the illustrated embodiment, these guide surfaces are generally vertical, elongated guide structures (e.g., the guide pins 82 and 84). The illustrated wire guide 108 also includes a guide structure 110 into which the guide pins 82 and 84 are mounted. The guide structure 110 secures the guide pins 82 and 84 to the wire drive assembly 58, e.g., to a drive assembly housing 112 of the wire drive assembly 58. The guide structure 110 also extends toward the rollers 60 and 64 to maintain the wire 52 between the rollers 60 and 64 during an initial threading of the wire 52. The illustrated wire guide 108, including the guide pins 82 and 84 and the guide structure 110, may enable a welding operator to thread the wire 52 by hand into alignment with the rollers 60 and 64, due to the opening defined by the guide pins 82 and 84 and the shape of the guide structure 110. Specifically, the wire guide 108 may allow the operator to self-thread the wire 52 into alignment with grooves formed in the rollers 60 and 64, while holding the wire 52 from a desired distance away from the rollers 60 and 64.

In the following discussion, reference may be made to various directions, including a downstream direction indicative of the direction in which the welding wire 52 is fed through the wire feeder 30. Other directions may be referenced as upstream, downstream, upward, downward, inboard, and outboard. The upstream direction is opposite the downstream direction, and these generally follow the flow of the wire through the device. The upward direction is opposite the downward direction, and these generally refer to the physical orientation of the device. The inboard direction is opposite the outboard direction, and in general the inboard direction is towards the body of the mechanism described, while the outboard direction is towards the free side (e.g., the right side in the orientation pictured). The downstream, upward, and inboard directions are represented in FIGS. 10-14 by axes 114, 116, and 118, respectively.

Figure 11:
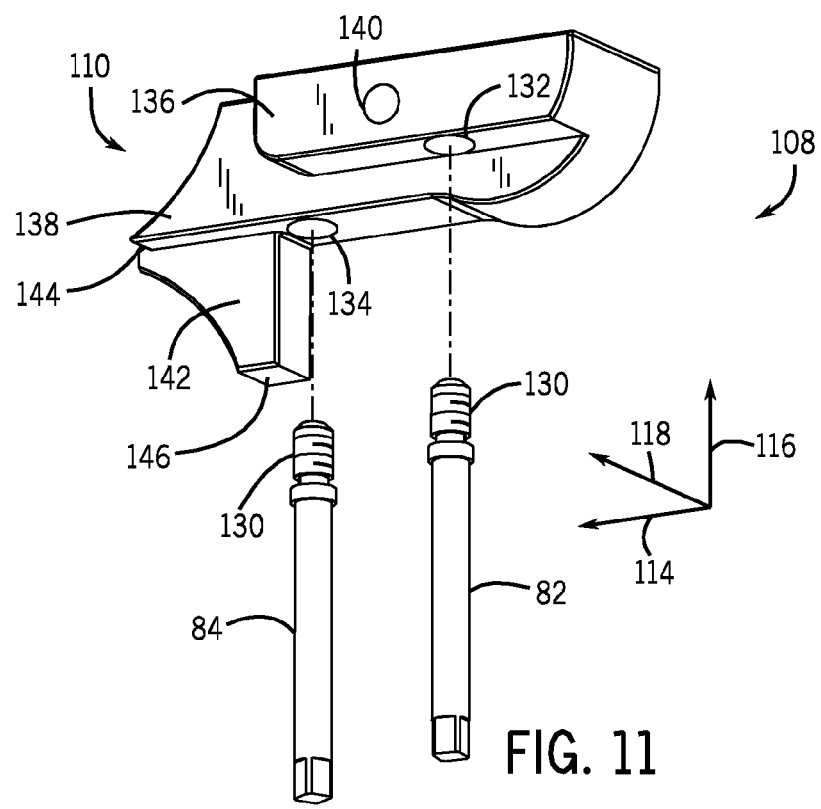
FIG. 11 is an exploded perspective view of an embodiment of the wire guide of FIG. 10, including a wire guide holder with two guide pins.

FIG. 11 is an exploded perspective view of an embodiment of the wire guide 108 of FIG. 10, including the two guide pins 82 and 84 and the guide structure 110. The guide pins 82 and 84, which are configured to guide the wire 52 as it is fed from the spool 54 to the rollers 60 and 64, may be removably coupled to the guide structure 110. In the illustrated embodiment, the guide pins 82 and 84 include threads 130 for fastening the guide pins 82 and 84 to the guide structure 110. The illustrated guide structure 110 includes holes 132 and 134 into which the guide pins 82 and 84, respectively, may be inserted and mounted via the threads 130. The hole 132 is located in an inboard portion 136 of the guide structure 110, and the hole 134 is located in an outboard portion 138 of the guide structure 110. Thus, the guide pins 82 and 84 act as inboard and outboard guide surfaces, respectively, for the wire 52, where the inboard guide surface is located upstream of the outboard guide surface. In the illustrated embodiment, the outboard portion 138 of the guide structure 110 extends farther in the downward direction than the inboard portion 136. This may provide lateral support to the guide pin 82 mounted to the inboard portion 136. An aperture 140 is located through the guide structure 110 so that a screw may be inserted for securing the wire guide 108 to the wire drive assembly 58.

The guide structure 110 also includes a side flange 142 adjacent to the outboard pin 84 and extending downward from the outboard portion 138 of the guide structure 110. When the guide structure 110 is mounted to the wire drive assembly 58, the side flange 142 extends toward the rollers 60 and 64 to facilitate threading of the wire 52 into the rollers. Indeed, the outboard portion 138 may include a tapered end 144, partially formed by the side flange 142 and configured to fit proximally to the rollers 60 and 64. Consequently, the side flange 142 may inhibit an operator from positioning the wire 52 too far in the outboard direction when inserting the wire 52 between the rollers 60 and 64. Once the wire 52 has been positioned between the rollers 60 and 64, the wire feeder 30 may feed the wire 52 from the spool 54 to the rollers 60 and 64 without the wire 52 contacting the side flange 142. Instead, the wire 52 may be directed to the wire drive assembly 58 through the opening formed between the guide pins 82 and 84, as previously discussed in relation to FIGS. 3-6. That way, once the rollers 60 and 64 receive and begin feeding the wire 52, the wire 52 may experience minimal contact with the wire guide 108 as it is fed through the wire drive assembly 58.

The side flange 142 of the guide structure 110 establishes an outboard boundary for the wire 52 as the wire 52 passes beyond the guide pin 84 in the downstream direction 114. The drive assembly housing 112, upon which the guide structure 110 may be mounted, acts as an inboard boundary, and the guide structure 110 acts as an upper boundary. The illustrated embodiment of the wire guide 108 does not include a lower boundary, but instead has an open lower side beneath the opening and between the guide pins 82 and 84. In certain embodiments, the guide structure 110 may include a lower edge for establishing a lower boundary for the wire 52 being inserted between the rollers 60 and 64. For example, a lower portion 146 of the side flange 142 may protrude in the inboard direction 118 to establish a lower boundary for the wire 52.

It should be noted that FIG. 11 is one example of the wire guide 108 that may be used to direct the wire 52 toward the rollers 60 and 64 using the side flange 142 extending toward the rollers 60 and 64. Other embodiments may include one or more guide surfaces integral with the guide structure 110 for directing the wire 52, instead of having the removable guide pins 82 and 84. In addition, the tapered end 144 of the wire guide 108 may be relatively more rounded than shown in FIG. 10, potentially making the wire guide 108 easier to manufacture. The guide structure 110 may be manufactured using powdered metal, die casting, machining, or some other industrial process.

Figure 12:
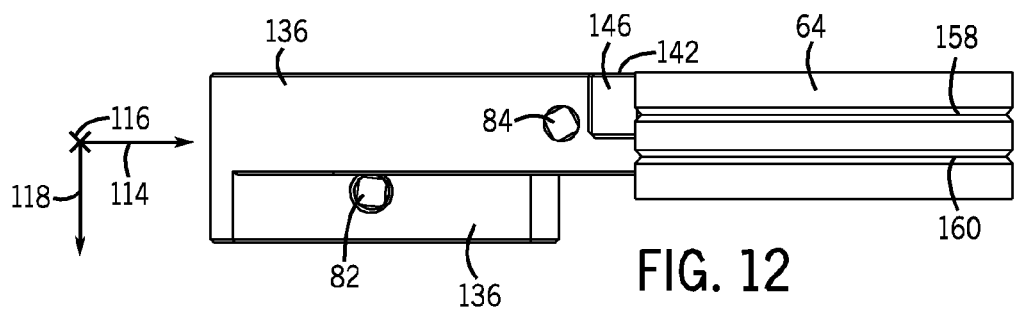
FIG. 12 is a bottom view of certain components of the wire drive assembly of FIG. 10.

FIG. 12 is a bottom view of certain components of the wire feeder 30 of FIG. 10, including the wire guide 108 and the drive roller 64. The wire guide 108 includes the side flange 142 for maintaining the wire 52 tracking to a desired region (e.g., a groove) of the drive roller 64. The illustrated embodiment includes two grooves 158 and 160 formed along an outer circumference of the drive roller 64. The idle roller 60 may include similar grooves formed along its outer circumference, and the wire 52 is configured to align with the groove 160 as the rollers 60 and 64 feed the wire 52 toward a welding application. Therefore, it may be undesirable for an operator to insert the wire 52 into the groove 158 when threading the wire 52. The guide pin 84 is spaced from the drive roller 64 in the upstream direction. The side flange 142 extends into the space between the drive roller 64 and the guide pin 84, inhibiting the wire from aligning with the groove 158. Thus, an operator may thread the wire 52 into the groove 160, even while holding the wire 52 at a position upstream of the guide pins 82 and 84. As previously mentioned, once the wire 52 is threaded into the groove 160 of the rollers 60 and 64, the wire 52 may be directed from the spool 54 to the rollers 60 and 64 entirely by the guide pins 82 and 84. Thus, the side flange 142 may maintain the wire 52 in the groove 160 during initial threading, and then no longer contact the wire 52 as the wire feeder 30 operates.

Figure 13:
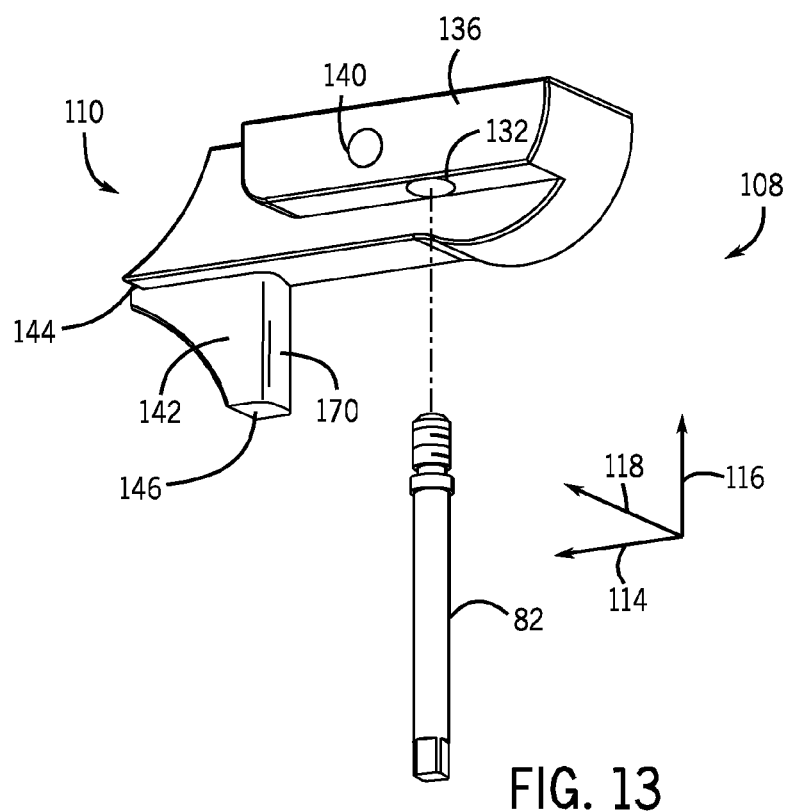
FIG. 13 is an exploded perspective view of an embodiment of the wire guide of FIG. 10, having a slide flange integral with an outboard guide surface.
Figure 14:
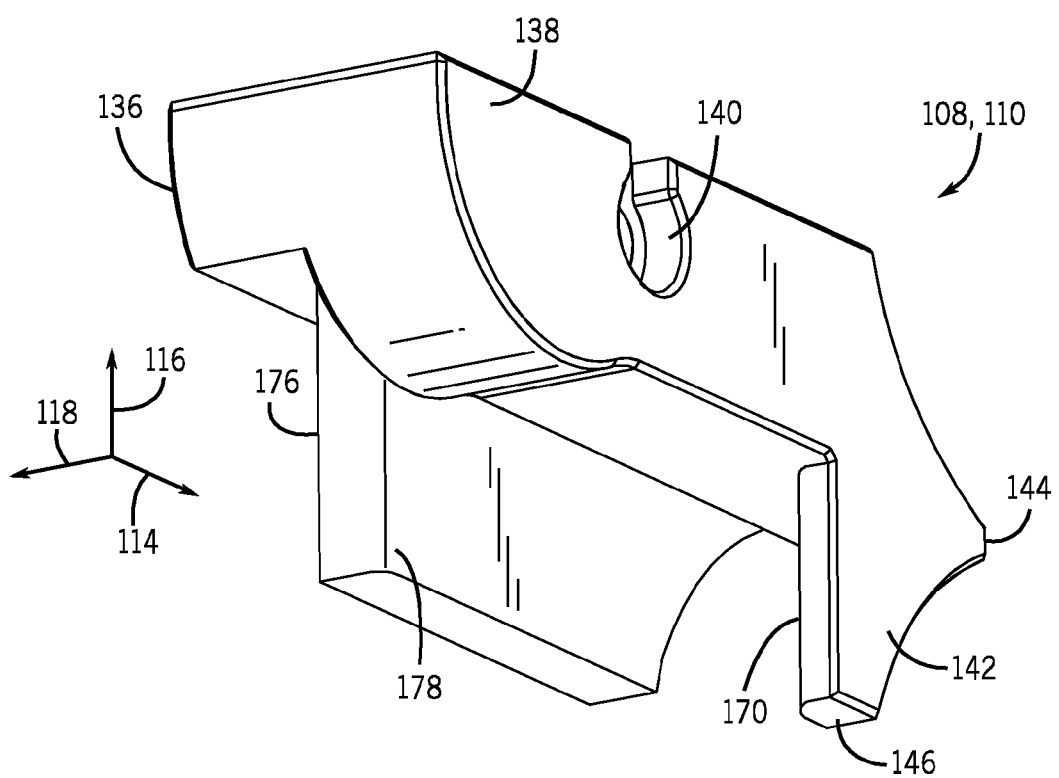
FIG. 14 is a perspective view of an exemplary embodiment of the wire guide of FIG. 10, including guide surfaces formed integrally into a one-piece structure.

FIGS. 13 and 14 are exploded perspective views of two other embodiments of the wire guide 108 of FIG. 10. As previously mentioned, one or more of the guide pins 82 and 84 may be incorporated into the guide structure 110, so that the wire guide 108 directs the wire 52 throughout wire feeding operations and during initial threading. FIG. 13 illustrates the wire guide 108 having the side flange 142 integral with the guide pin 84 to form an outboard guide surface of the wire guide 108. In this embodiment, the side flange 142 includes a rounded edge 170 along the inboard side of the side flange 142. The rounded edge 170 offers a minimal point of contact for the wire 52 being fed through the wire feeder 30. In this way, the side flange 142 may enable proper threading of the wire 52 into the rollers 60 and 64, and the side flange 142 may direct the wire 52 after the initial threading.

FIG. 14 illustrates another embodiment of the wire guide 108, which has inboard and outboard guide surfaces formed integrally into the guide structure 110. The one-piece guide structure 110 may be secured to the wire drive assembly 58 as previously described in reference to FIG. 10. The guide structure 110 includes the rounded edge 170 of the side flange 142 to direct the wire 52 after the wire 52 is threaded into the rollers 60 and 64. The inboard guide surface may be an inboard surface 176 extending downward from the inboard portion 136 of the guide structure 110, instead of the guide pin 82. The inboard surface 176 includes a rounded edge 178 along the outboard side of the inboard surface 176 for directing the wire 52 between the spool 54 and the rollers 60 and 64 during the wire feeding process. Thus, the one-piece structure of the illustrated wire guide 108 may maintain tracking of the wire 52 to a desired region of the rollers 60 and 64 using the side flange 142 and the inboard surface 176, and may guide the wire 52 coming off the spool 54 to the rollers 60 and 64 with the rounded edges 170 and 178.

It should be noted that other arrangements of the wire guide 108 may be possible for facilitating proper threading of the wire 52 and for guiding the wire 52 after the wire 52 is threaded. For example, the wire guide 108 may include the inboard surface 176 on the inboard side of the guide structure 110 and the guide pin 84 on the outboard side for directing the wire 52 after threading, in addition to the side flange 142. The rounded edges 170 and 178 may be more or less rounded than shown in the illustrated embodiments. The inboard surface 176 may extend any desired distance in the downstream direction 114 (until reaching the rollers 60 and 64). Extending the inboard surface 176 a shorter distance in the downstream direction 114 may use less material, potentially decreasing material costs for manufacturing the guide structure 110. In addition, the wire guide 108 of FIG. 14 may include a lower surface extending between the side flange 142 and the inboard surface 176, making the wire guide 108 a closed structure around the path of the wire 52.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding wire feed device, comprising:
   a spool support configured to receive and support a spool of welding wire;
   a wire drive assembly configured to draw wire from the spool and to drive the wire towards a welding application; and
   a wire guide having a guide structure and two elongated guide pins coupled to the guide structure, wherein the two elongated guide pins are spaced from one another to define an opening through which the wire is guided from the spool to the wire drive assembly, a first pin of the two elongated guide pins is upstream of a second pin of the two elongated guide pins relative to the spool, and the two elongated guide pins are stationary with respect to the guide structure,
   wherein the wire guide comprises a side flange adjacent an outboard guide surface and positioned to maintain the welding wire tracking to a desired region of a wire drive roller, and the wire guide comprises a tapered end at least partially formed by the side flange and configured to fit proximally to the wire drive roller.

2. The device of claim 1, wherein the guide pins and the opening are disposed generally vertically.

3. The device of claim 1, wherein the guide pins and the opening are disposed between the spool support and the wire drive assembly.

4. The device of claim 1, wherein the wire guide comprises an open lower side beneath the opening and between the guide pins.

5. The device of claim 1, wherein the guide pins are formed integrally in a single piece secured to the wire drive assembly.

6. The device of claim 1, wherein the side flange is integral with the outboard guide surface.

7. A welding wire feed device, comprising:
a wire guide having a guide structure and two elongated guide pins coupled to the guide structure, wherein the two elongated guide pins are spaced from one another to define an opening through which welding wire is guided from a spool to a wire drive assembly, the guide structure has a side flange extending from an outboard portion of the guide structure to maintain the welding wire tracking to a desired region of a roller of the wire drive assembly, a first pin of the two elongated guide pins is upstream of a second pin of the two elongated guide pins relative to the spool, and the two elongated guide pins are stationary with respect to the guide structure, and wherein the wire guide comprises a tapered end at least partially formed by the side flange and configured to fit proximally to the roller.

8. The device of claim 7, wherein the guide pins and opening are disposed generally vertically.

9. The device of claim 7, wherein the guide pins and the opening are disposed between the spool and the wire drive assembly.

10. The device of claim 7, wherein the wire guide comprises an open lower side between the guide pins and beneath the opening.

11. The device of claim 7, wherein the guide pins comprise inboard and outboard guide surfaces, the inboard guide surface being spaced upstream of the outboard guide surface.

12. The device of claim 11, wherein the side flange is integral with the outboard guide surface.

13. The device of claim 7, wherein the guide pins and the side flange are formed integrally in a single piece secured to the wire drive assembly.

14. A welding wire feed device, comprising:
a wire guide having a guide structure and inboard and outboard guide pins coupled to the guide structure, wherein the inboard and outboard guide pins are spaced from one another to define an opening through which welding wire is guided from a spool to a wire drive assembly, wherein the guide structure has a side flange adjacent the outboard guide pin for maintaining the welding wire tracking to a desired region of the wire drive assembly, and wherein the wire guide has a tapered end at least partially formed by the side flange and configured to fit proximally to the wire drive assembly;
wherein the inboard guide pin is spaced upstream relative to the outboard guide pin, and the inboard and outboard guide pins are stationary with respect to the guide structure.

15. The device of claim 14, wherein the inboard and outboard guide pins and the opening are disposed between the spool and the wire drive assembly.

16. The device of claim 14, wherein the side flange is integral with the outboard guide pin.

17. The device of claim 14, wherein the inboard and outboard guide pins are formed integrally in a single piece secured to the wire drive assembly.

\* \* \* \* \*